Patented Sept. 22, 1936

2,055,377

UNITED STATES PATENT OFFICE 2,055,377

MONO-AZODYESTUFFS

Richard Fleischhauer, Frankfort-on-the-Main-Fechenheim, Germany, assignor to General Aniline Works, Inc., New York, N. Y., a corporation of Delaware No Drawing. Application October 7, 1933, Serial No. 692,700. In Germany October 13, 1932

4 Claims. (Cl. 260—92)

This invention relates to mono-azodyestuffs, more particularly to those corresponding to the general formula:

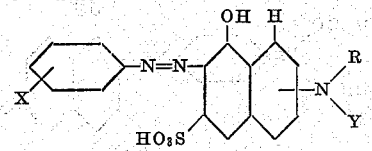

wherein X means

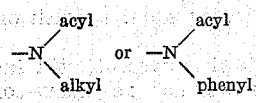

Y means hydrogen, alkyl or phenyl, R means acetyl or benzoyl and wherein the phenyl nuclei may contain as substituents methyl or sulfonic acid groups.

These dyestuffs are obtained by combining a diazo-compound of an aromatic amine corresponding to the formula:

wherein X means

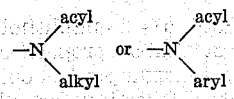

and the benzene nucleus may contain substituents, with an 2- or 3- or 4-acylamino-8-hydroxy-naphthalene-6-sulfonic acid corresponding to the formula:

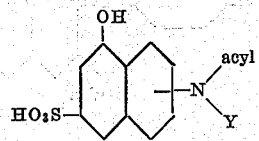

wherein Y means alkyl or aryl or hydrogen.

Some representatives of this grouping of combining components have been already used for the synthesis of azodyestuffs (British Patents 6,697 of 1895 and 24,296 of 1899 and French Patent 422,784) but combined with other diazo-compounds. The dyestuffs thus obtained don't fulfill the requirements of practice as to solubility, fastness or leveling power.

Furthermore diazo-compounds of the named grouping have been already combined with other combining components (German Patent 296,964, British Patents 216,971 and 337,577). In comparison to these known dyestuffs the dyestuffs of the present invention are distinguished partly by a better leveling power, partly by a better fastness to light.

The present invention represents a valuable enrichment of the industry. According to the invention orange to red dyestuffs are obtained of a very good leveling power and fastness to light which are especially suitable for dyeing animal fibers but may also be used for other dyeing purposes.

The components used may be varied in such a manner that e. g. the acyl-amino-group contains the following residues: methyl, ethyl, propyl, butyl, benzyl and so on, further phenyl and its substitution products. As acyl residues for example acetyl, benzoyl, benzene-sulfonyl and their substitution products or also the urethane group may be named.

In order to further illustrate my invention the following examples are given, the parts being by weight and all temperatures in centigrade degrees; but I wish it, however, to be understood that my invention is not limited to the examples given, nor to the exact conditions stated therein.

Example 1

24 parts of N-ethyl-benzoyl-amino-4-amino-benzene are dissolved with water and about 35 parts of hydrochloric acid (specific gravity 1.16) and diazotized while cooling with ice with 6.9 parts of sodium nitrite. The nearly colorless diazo-solution thus obtained is allowed to run at about 10° while stirring into a solution of 29 parts of 2-acetyl-amino-8-naphthol-6-sulfonic acid containing an excess of sodium acetate. When developing is finished the dyestuff is isolated and dried. It corresponds to the formula:

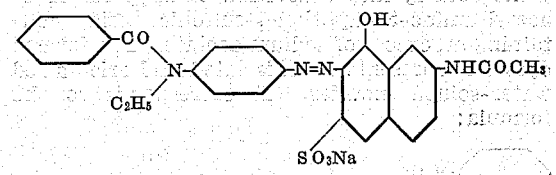

and forms a reddish brown water-soluble powder dyeing wool from an acid bath very equal red shades which are very fast to light.

The developing may also be carried out in the presence of sodium bicarbonate or of similar weakly acting neutralizing agents.

N-ethyl-benzoyl-amino-3-amino-4-methyl-benzene yields a more yellowish red dyestuff of a likewise excellent leveling power and a similar good fastness to light.

Dyestuffs of a red shade may also be obtained by replacing the diazo-compound named in paragraph 1 by the equivalent amounts of the diazo-compounds of N-(n-butyl)-benzoyl-amino-4-amino-benzene or N-(p-chloro-benzyl)-benzoyl-amino-4-amino-benzene.

*Example 2*

22.6 parts of N-phenyl-acetyl-amino-4-amino-benzene are diazotized in an analogous manner as described in Example 1. The diazo-solution is developed in an acetic acid medium with the solution of 29 parts of 2-acetyl-amino-8-naphthol-6-sulfonic acid. After isolating and drying a reddish brown dyestuff-powder is obtained being easily soluble in water and dyeing wool very equal red shades fast to light. It corresponds to the following formula:

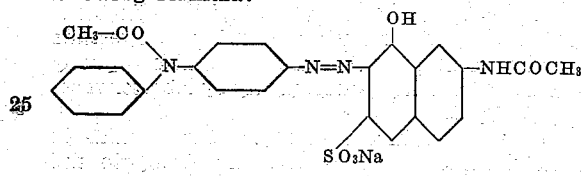

A similar dyestuff is obtained by using as combining component 2-anisoyl-amino-8-naphthol-6-sulfonic acid.

*Example 3*

17.8 parts of N-ethyl-acetyl-amino-4-amino-benzene are diazotized as usually. The obtained diazo-solution is allowed to run into a solution of 35 parts of 2-benzoyl-amino-8-naphthol-6-sulfonic acid containing an excess of sodium acetate. After isolating and drying the obtained dyestuff forms a reddish brown water-soluble powder dyeing wool from an acid bath very equal red shades which are fast to light. It corresponds to the formula:

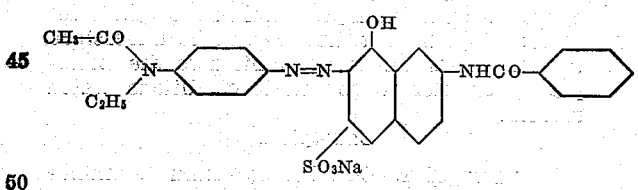

Instead of 2-benzoyl-amino-8-naphthol-6-sulfonic acid also its derivatives which are e. g. substituted in the benzoyl radical by $CH_3$, $OCH_3$, Cl or $NO_2$ may be used.

*Example 4*

24 parts of N-ethyl-benzoyl-amino-4-amino-benzene are diazotized as described in Example 1 and the obtained diazo-solution is allowed to run while cooling into a solution of 29 parts of 1-acetyl-amino-5-naphthol-7-sulfonic acid containing an excess of sodium acetate. The formed dyestuff represents when isolated and dried a red water-soluble powder. It corresponds to the formula:

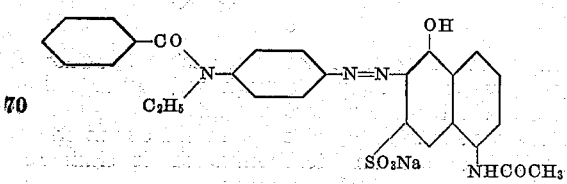

and dyes the animal fiber very equal red shades being fast to light.

By using instead of 1-acetyl-amino-5-naphthol-7-sulfonic acid the equivalent amount of 2-benzoyl-amino-8-naphthol-6-sulfonic acid, a little more bluish dyestuff of likewise good fastness qualities is obtained.

More yellowish dyestuffs with similar properties may be obtained by using as combining component e. g. 2-benzoyl-methyl-amino-8-naphthol-6-sulfonic acid or 2-acetyl-methyl-amino-8-naphthol-6-sulfonic acid.

*Example 5*

20.6 parts of N-(n-butyl)-acetyl-amino-4-amino-benzene are diazotized in an analogous manner as described in Example 1. The obtained diazo-solution is allowed to run into a solution of 29 parts of 2-acetyl-amino-5-naphthol-7-sulfonic acid containing an excess of sodium acetate. The separated and dried dyestuff forms a bright reddish orange colored powder which corresponds to the formula:

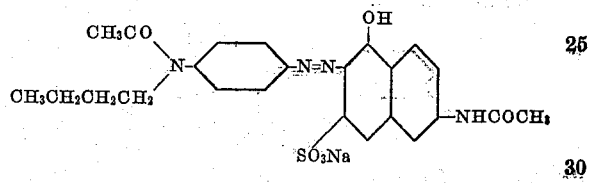

and dyes wool very equal reddish orange shades fast to light.

A more yellowish dyestuff still faster to light may be obtained by using as diazo-component the equivalent amount of N-(n-butyl)-acetyl-amino-4-amino-benzene-2-sulfonic acid.

*Example 6*

When replacing in Example 1 the 2-acetyl-amino-8-naphthol-6-sulfonic acid by 31.1 parts of 2-(carbethoxy-amino)-8-naphthol-6-sulfonic acid a dyestuff of similar properties to that obtained according to Example 1 is obtained which corresponds to the following formula:

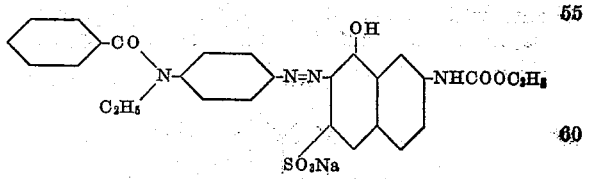

Instead of 2-(carbethoxy-amino)-8-naphthol-6-sulfonic acid other urethanes of amino-naphthol-sulfonic acids e. g. those which contain the group $COOCH_3$ or $COOCH_2CH_2CH_3$ attached to the nitrogen, may be used.

Similar dyestuffs with analogous fastness qualities are obtainable by employing in the above examples as combining components e. g. 2-acetyl-phenyl-amino-8-naphthol-6-sulfonic acid, 2-(acetyl-methyl-amino)-5-naphthol-7-sulfonic acid or 2-(2',5'-dichloro-benzoyl)-methyl-amino-5-naphthol-7-sulfonic acid.

I claim:—
1. The mono-azodyestuffs corresponding to the general formula

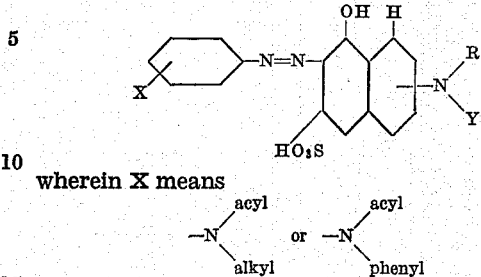

wherein X means

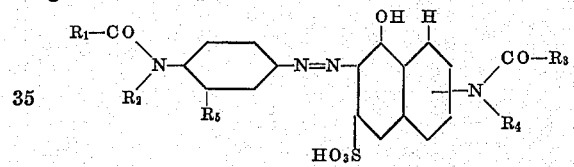

Y means hydrogen, alkyl or phenyl, R means acetyl or benzoyl and wherein the phenyl nuclei contains a member of the group consisting of hydrogen, methyl, and sulfonic acid, which dyestuffs dye animal fibers orange to red shades of a good leveling power and fastness to light.

2. The mono-azodyestuffs corresponding to the general formula

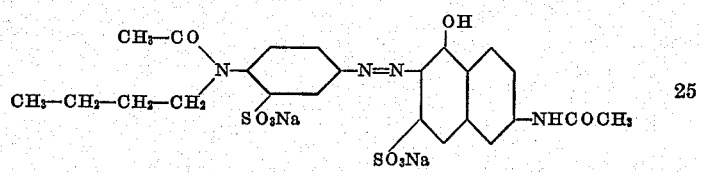

wherein $R_1$ and $R_3$ mean methyl or phenyl, $R_2$ alkyl or phenyl, $R_4$ hydrogen alkyl or phenyl and $R_5$ means hydrogen or a sulfonic acid group, which dyestuffs dye animal fibers orange to red shades of a good leveling power and fastness to light.

3. The mono-azodyestuff of the formula

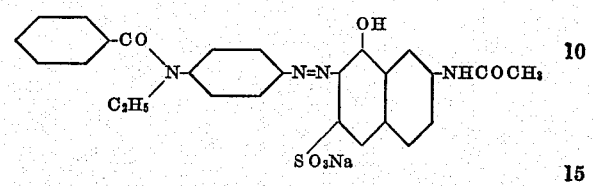

which dyestuff forms a reddish brown water-soluble powder dyeing wool from an acid bath very equal red shades which are very fast to light.

4. The mono-azodyestuff of the formula which dyestuff forms a bright orange colored powder and dyes wool very equal reddish orange shades fast to light.

RICHARD FLEISCHHAUER.